United States Patent
Benammar et al.

(10) Patent No.: US 10,104,594 B2
(45) Date of Patent: Oct. 16, 2018

(54) APPARATUS AND METHOD FOR EFFICIENT HANDOVER FOR LOW EARTH ORBIT (LEO) SATELLITE SYSTEMS

(71) Applicant: Hughes Network Systems, LLC, Germantown, MD (US)

(72) Inventors: Nassir Benammar, Rockville, MD (US); Deepak Arur, McLean, VA (US); Channasandra Ravishankar, Clarksburg, MD (US); Yash Vasavada, Gandhinagar (IN)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 15/687,858

(22) Filed: Aug. 28, 2017

(65) Prior Publication Data
US 2017/0374596 A1 Dec. 28, 2017

Related U.S. Application Data

(63) Continuation of application No. 15/333,979, filed on Oct. 25, 2016, now Pat. No. 9,749,928, which is a (Continued)

(51) Int. Cl.
*H04W 36/30* (2009.01)
*H04B 7/185* (2006.01)
(Continued)

(52) U.S. Cl.
CPC ........ *H04W 36/30* (2013.01); *H04B 7/18517* (2013.01); *H04W 36/14* (2013.01);
(Continued)

(58) Field of Classification Search
CPC ... H04W 36/30; H04W 36/14; H04W 36/165; H04W 36/0083; H04W 36/10;
(Continued)

(56) References Cited

U.S. PATENT DOCUMENTS 5,574,968 A  11/1996  Olds et al.
6,104,911 A * 8/2000  Diekelman ........ H04B 7/18534
                                              342/352

(Continued)

FOREIGN PATENT DOCUMENTS

EP  0637142 A1  2/1995
EP  0920143 A1  6/1999
EP  1764933 A1  3/2007

OTHER PUBLICATIONS

EPO, "Extended European Search Report & Written Opinion", EP15805999.8, dated Oct. 26, 2017.
(Continued)

*Primary Examiner* — Hirdepal Singh
(74) *Attorney, Agent, or Firm* — Potomac Technology Law, LLC

(57) ABSTRACT

A method for satellite to satellite handover of a user terminal in a satellite communications network is provided. The UT receives an initial handover message, from a RAN node, including a target frequency for receiving downlink transmissions from the RAN node via a target satellite and a timing correction, and reconfigures its receiver for receipt of the downlink transmissions via the target frequency. The UT decodes the downlink transmissions to determine allocations for a PRACH of the target satellite provided by the downlink transmissions, and transmits a reply handover message to the RAN node, via the PRACH channel, using the timing correction. The UT receives a flow assignment message from the RAN. The UT reactivates hand-over data flows for the target satellite, and transmits a channel configuration complete message to the RAN node, via the PRACH channel, using the timing correction.

2 Claims, 10 Drawing Sheets

Related U.S. Application Data continuation of application No. 14/662,299, filed on Mar. 19, 2015, now Pat. No. 9,479,993.

(60) Provisional application No. 61/955,558, filed on Mar. 19, 2014.

(51) Int. Cl.
*H04W 36/14* (2009.01)
*H04W 36/16* (2009.01)
*H04W 36/10* (2009.01)
*H04W 84/06* (2009.01)
*H04W 36/00* (2009.01)

(52) U.S. Cl.
CPC ...... *H04W 36/165* (2013.01); *H04W 36/0083* (2013.01); *H04W 36/10* (2013.01); *H04W 84/06* (2013.01)

(58) Field of Classification Search
CPC ... H04W 84/06; H04B 7/18517; H04B 7/024; H04B 7/063; H04L 5/0035; H04L 5/0037
USPC ........................................................ 455/436
See application file for complete search history.

(56) References Cited

U.S. PATENT DOCUMENTS

| | | | |
|---|---|---|---|
| 6,122,507 A * | 9/2000 | Gerard | H04B 7/18541 455/12.1 |
| 6,609,002 B1 | 8/2003 | Krishnamurthy et al. | |
| 8,326,217 B2 * | 12/2012 | Wahlberg | H04B 7/195 370/316 |
| 8,743,722 B2 * | 6/2014 | Miura | H04J 11/0023 370/252 |
| 9,681,337 B2 * | 6/2017 | Davis | H04W 36/0005 |
| 9,826,454 B2 * | 11/2017 | Cili | H04W 36/30 |
| 2005/0053026 A1 * | 3/2005 | Mullan | H04B 7/18508 370/316 |
| 2005/0227631 A1 | 10/2005 | Robinett | |
| 2006/0007863 A1 | 1/2006 | Naghian | |
| 2008/0232258 A1 | 9/2008 | Larsson et al. | |
| 2009/0092074 A1 | 4/2009 | Jamalipour et al. | |
| 2010/0238853 A1 | 9/2010 | Zhou et al. | |
| 2010/0246480 A1 | 9/2010 | Aggarwal et al. | |
| 2010/0278141 A1 | 11/2010 | Choi-Grogan et al. | |
| 2012/0028627 A1 * | 2/2012 | Hunzinger | H04W 36/0083 455/422.1 |
| 2012/0131618 A1 * | 5/2012 | Lester | H04H 20/74 725/70 |
| 2012/0133554 A1 | 5/2012 | Bromley et al. | |
| 2013/0102309 A1 | 4/2013 | Chande et al. | |
| 2013/0156008 A1 | 6/2013 | Dinan et al. | |
| 2013/0225172 A1 * | 8/2013 | Singh | H04W 36/245 455/436 |
| 2014/0314000 A1 | 10/2014 | Liu et al. | |
| 2015/0063203 A1 * | 3/2015 | Kim | H04B 7/18513 370/326 |
| 2015/0109943 A1 | 4/2015 | Sahin et al. | |
| 2015/0126193 A1 * | 5/2015 | Huang | H04W 36/22 455/436 |
| 2015/0236781 A1 * | 8/2015 | Jalali | H04W 84/06 370/252 |
| 2016/0233947 A1 | 8/2016 | Shen et al. | |
| 2016/0360533 A1 * | 12/2016 | Bennett | H04W 72/0453 |
| 2017/0064583 A1 * | 3/2017 | Roy | H04W 36/0005 |

OTHER PUBLICATIONS

US Patent Office, "PCT Search Report & Written Opinion", Application No. PCT/US2015/021377, dated Dec. 7, 2015.

* cited by examiner

APPARATUS AND METHOD FOR EFFICIENT HANDOVER FOR LOW EARTH ORBIT (LEO) SATELLITE SYSTEMS

RELATED APPLICATIONS

This application is a continuation, and claims the benefit of the earlier filing date under 35 U.S.C. § 120, from U.S. application Ser. No. 15/333,979 (filed 2016 Oct. 25), now U.S. Pat. No. 9,749,928, which is a continuation, and claims the benefit of the earlier filing date under 35 U.S.C. § 120, from U.S. application Ser. No. 14/662,299 (filed 2015 Mar. 19), now U.S. Pat. No. 9,479,993, which claims the benefit of the earlier filing date under 35 U.S.C. § 119(e) of U.S. Provisional Application Ser. No. 61/955,558 (filed 2014 Mar. 19).

BACKGROUND

In a cellular wireless communications system, a handover or handoff of a user terminal (UT) or handset is a process of transferring an ongoing call or data session from one channel connected to the core network to another channel (e.g., from one cell serviced by one cell tower to another cell serviced by another cell tower). In a mobile satellite communications system, handover is the reassignment or the reconfiguration of radio links between the UT and a satellite, a satellite beam and carrier or triplet frequency set. The criteria to perform handover may vary from system to system, but in general handovers are triggered to select paths with better channel conditions.

Among different types of mobile satellite communications systems, satellites orbiting at different levels above the Earth may be employed, such as low Earth orbit (LEO) satellites, medium Earth orbit (MEO) satellites and geosynchronous Earth orbit (GEO) satellites. A GEO satellite orbits the Earth in a flying in a geosynchronous earth orbit, with an orbital period the same as the Earth's rotation period. A geosynchronous orbit is at an altitude of about 35,786 km (22,236 miles) above the Earth, and typically is directly above the Equator. A LEO satellite typically flies in an orbit around the Earth at an altitude between 160 kilometers or 99 miles (with an orbital period of about 88 minutes) and 2,000 kilometers or 1,200 miles (with an orbital period of about 127 minutes). Further, in a GEO satellite system, the beam footprint on the Earth is generally fixed based on the satellite antenna configuration. Unlike a GEO satellite, a LEO satellite constellation provides a unique mode of operation and associated challenges, where the footprint of each satellite beam on the Earth is constantly moving. Accordingly, mobile satellite systems employing LEO satellites require frequent handovers due to the beam movement across the Earth (even when there is no terminal movement and the channel condition is constant). In addition line of sight between the terminal and the satellite may change due to satellite movement.

What is needed, therefore, are approaches for efficient, dynamic and continuous handover processes, which encompass use of random access procedures and random access channels over which a user terminal (UT) communicates with the radio access network in a mobile satellite communications system.

SOME EXAMPLE EMBODIMENTS

The present invention advantageously addresses the foregoing requirements and needs, as well as others, by providing approaches for efficient, dynamic and continuous handover processes, which encompass use of random access procedures and random access channels over which a user terminal (UT) communicates with the radio access network in a mobile satellite communications system.

In accordance with example embodiments of the present invention, a method for handover of a user terminal (UT) from a source satellite to a target satellite in a satellite communications network, is provided. The UT receives an initial handover message from a radio access network (RAN) node of the satellite communications network, wherein the initial handover message includes a target frequency for receiving downlink data transmissions from the RAN node via the target satellite and a timing correction. The UT reconfigures its receiver for receipt of the downlink data transmissions, from the target satellite, via the target frequency. The UT decodes the downlink data transmissions to determine allocations for a physical random access channel (PRACH) of the target satellite provided by the downlink data transmissions. The UT transmits a reply handover message to the RAN node, via the PRACH channel of the target satellite, using the timing correction included in the handover message. The UT receives a flow assignment message from the RAN, via the downlink message transmissions of the target satellite. The UT reactivates hand-over data flows for transmission and receipt via the target satellite. The UT transmits a channel configuration complete message to the RAN node, via the PRACH channel of the target satellite, using the timing correction included in the handover message.

In accordance with further example embodiments of the present invention, a satellite user terminal (UT) is provided. The satellite UT comprises a receiver configured to receive downlink data transmissions to a radio access network (RAN) node of a satellite communications network via one or more satellites of the satellite communications network. The satellite UT further comprises a transmitter configured to transmit uplink data transmissions to the RAN node via the one or more satellites of the satellite communications network. The satellite UT further comprises a processor. The receiver is configured to receive an initial handover message from the RAN node, wherein the initial handover message includes a target frequency for receiving downlink data transmissions from the RAN node via a target satellite of the one or more satellites and a timing correction. The processor is configured to reconfigure the receiver for receipt of the downlink data transmissions, from the target satellite, via the target frequency, to decode the downlink data transmissions to determine allocations for a physical random access channel (PRACH) of the target satellite provided by the downlink data transmissions, and to initiate a transmission, via the transmitter, of a reply handover message to the RAN node, via the PRACH channel of the target satellite, using the timing correction included in the handover message. The receiver is further configured to receive a flow assignment message from the RAN, via the downlink message transmissions of the target satellite. The processor is further configured to reactivate hand-over data flows for transmission and receipt via the target satellite, and to initiate a transmission, via the transmitter, of a channel configuration complete message to the RAN node, via the PRACH channel of the target satellite, using the timing correction included in the handover message.

BRIEF DESCRIPTION OF THE DRAWINGS

Example embodiments of the present invention are illustrated by way of example, and not by way of limitation, in the figures of the accompanying drawings, and in which like reference numerals refer to similar elements, and wherein.

DETAILED DESCRIPTION

Approaches for efficient, dynamic and continuous handover processes, which encompass selection of an optimal path (consisting of a satellite, a satellite beam and carrier frequency set) over which a user terminal (UT) communicates with the radio access network in a mobile satellite communications system, are described. In the following description, for the purposes of explanation, numerous specific details are set forth in order to provide a thorough understanding of example embodiments of the invention. It will be apparent to one skilled in the art, however, that further embodiments may be practiced without these specific details or with an equivalent arrangement. In other instances, well-known structures and devices are shown in block diagram form in order to avoid unnecessarily obscuring the embodiments of the invention. Further, as will be appreciated, a module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components. Further, with respect to the various exemplary embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention.

Further, various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Figure 1:
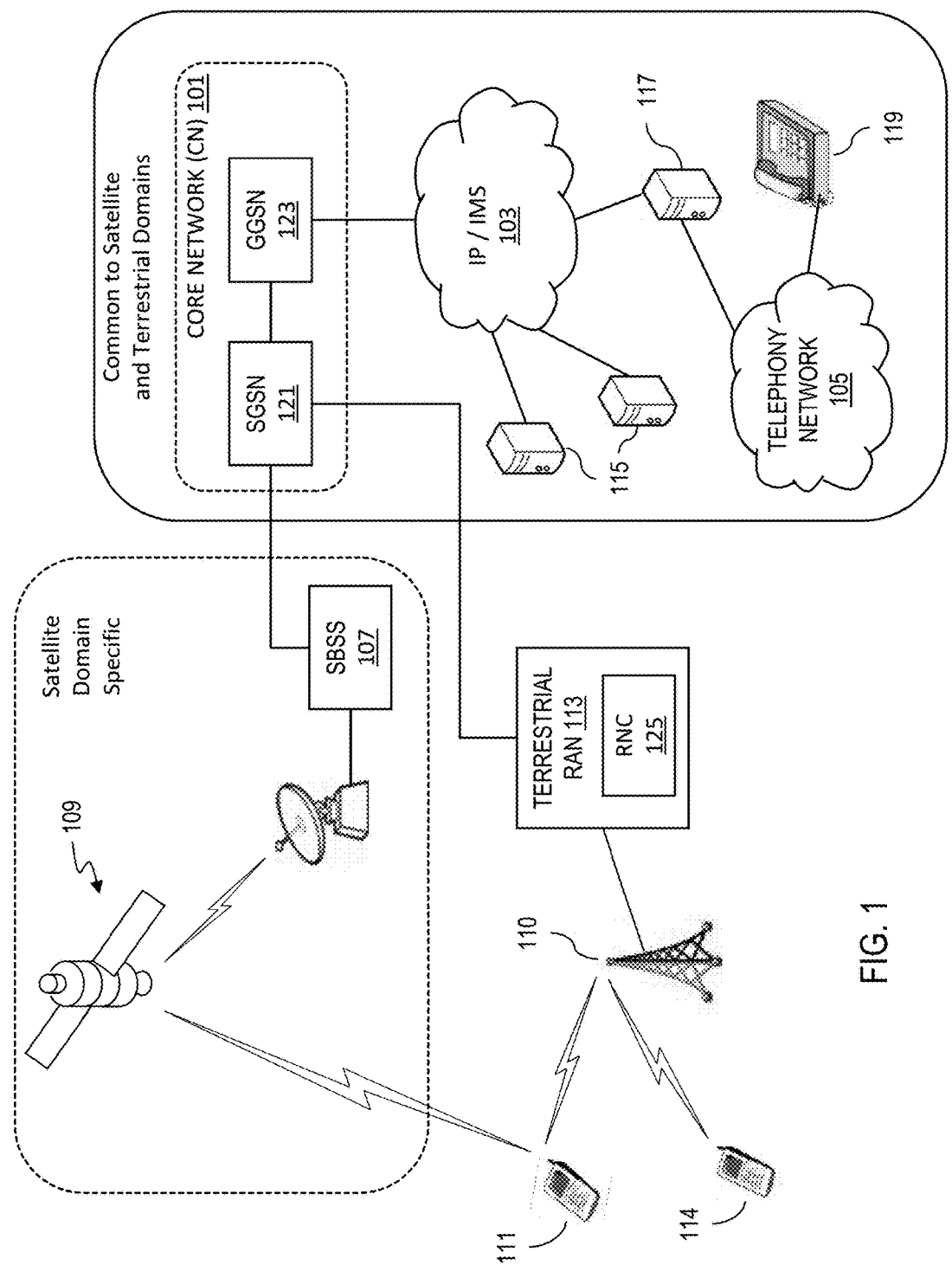
FIG. 1 illustrates a diagram of a communications system capable of providing approaches for dynamic and efficient terminal handover in a wireless communications system, in accordance with example embodiments of the present invention.

FIG. 1 illustrates a diagram of a communications system capable of providing approaches for dynamic and efficient terminal handover in a wireless communications system, in accordance with example embodiments of the present invention. The terrestrial radio access network (RAN) 113 generally controls all handovers. The RAN is the element in a mobile communications network that implements the radio access technology of the underlying physical connection methods for a radio based communications network. The RAN generally provides connection between the user terminal (UT) 111/114 (e.g., a mobile phone) and the core network (CN) 101. The CN comprises the central part of a telecommunications network, which generally provides services (e.g., routing calls across a public service telephony network (PSTN) 105 to end users utilizing the telecommunications network via an access network 103). Example embodiments further provide approaches for the approximation of handover factors to evaluate available paths and make handover decisions, when the radio access network (RAN) cannot acquire full information necessary to evaluate all the factors. Moreover, according to example embodiments, forward link and return link handovers are evaluated independently, and no symmetry is assumed between the forward and return path beam patterns and path metrics evaluation.

With further reference to FIG. 1, the system 100 enables handover procedures between terrestrial base-station and the SBSS 107 to be executed via a core network 101 with standard procedures defined in terrestrial systems. In the example system 100, the UT 111/114 has the capability to communicate over a satellite link (via the satellite 109 and satellite base station subsystem (SBSS) or satellite gateway (GW) 107) to the wireless core network (CN) 101, or communicate over a terrestrial wireless cell station or tower 110 with a terrestrial radio access network (RAN) 113 to the wireless core network (CN) 101. The RAN comprises a radio network controller (RNC) 125, which is responsible for the radio resource management functions and certain mobility management functions of the network. By way of example, the data network 103 is configured as an IP/IMS (IP Multimedia Subsystem) with multiple application servers 115 supplying multimedia content. The data network 103 couples to the PSTN 105 via a media gateway 117; the PSTN can serve one or more voice terminals 119.

A radio access bearer (RAB) is associated with Packet Data Protocol (PDP) context maintained between the user terminal (UT) 111/114 and the core network (CN) 101. For instance, one RAB can be established for Session Initiation Protocol (SIP) call signaling, and be maintained as long as the user wishes to make and receive calls. Another RAB is established on demand for the transport of the voice media while a call is in session. The satellite radio access network establishes and maintains Radio Bearers (RBs) between the UT and the SBSS 107 necessary to satisfy, for example, Quality of Service (QoS) requirements of the SIP call signaling and Voice over IP (VoIP) user plane RABs. The signaling radio bearer supports signaling connectivity between the UT and the satellite radio access network.

SIP protocol is typically used for establishing the initiation, and the management, of a session. A SIP message mainly contains three sections detailing the session, timing and media descriptions. A Packet Data Protocol (PDP) context is created for each session initiated, which contains the desired characteristics of the specific session, including the PDP type and the demanded QoS among other parameters. A PDP context can be viewed as a set of information maintained by UT, GGSN and SGSN. It contains a PDP type that identifies the type of Packet Data Network (PDN), the PDP address, QoS information and other session information. Activating a PDP context refers to creating the PDP context at the UT, SGSN and GGSN so that UT can communicate with an entity in PDN using the PDP address maintained in the PDP context. Further, a secondary PDP context activation allows the subscriber to establish a PDP context with a different QoS profile to the same PDN.

The Core Network (CN) 101 may include a Proxy-Call Session Control Function (P-CSCF), a Serving-Call Session Control Function (S-CSCF), an Interrogating-Call Session Control Function (I-CSCF), a Media Resource Function Controller (MRFC), a Media Resource Function Processor (MRFP), a Media Gateway (MGW), a Media Gateway Controller Function (MGCF) and a Signaling Gateway (SGW). Note that these components are the components that relate to Session Initiation Protocol (SIP). For other applications, however, the CN 101 may include different components. Additionally, all such components associated with SIP signaling are known in the art, and thus are not shown in the Figures and their functionality is not discussed in detail herein. Moreover, as will be appreciated, system 100 may embody many forms and include multiple and/or alternative components and facilities.

According to example embodiments, approaches are provided for performing a terminal handover, taking into account a multitude of factors for the selection of the best available set of paths. By way of example, a set of a satellite, a satellite beam and frequency for forward and return link directions need not be the same and no symmetry is assumed in forward and return link direction beam patterns. Example algorithms, according to embodiments of the invention, may combine a set of metrics to select an optimal path, balancing multiple parameters, such as signal to noise ratio, expected duration of beam coverage, and other parameters, described in further detail below. The approaches further provide for seamless handover from current paths to alternate paths deemed as more optimal, wherein no transmission data loss is experienced unless a handover involves a frequency handover. By way of further example, as opposed to just considering channel condition as the primary factor for making handover decisions, example embodiments provide for the consideration of various relevant factors, and a flexible method for weighting such factors based on, for example, system characteristics and system design goals. In satellite communications systems, handover comprises the reassignment or the reconfiguration of radio links between a terminal and a satellite, a satellite beam and carrier frequency triplet or set. The criteria for performing handover varies from system to system, but in general handovers are triggered to select paths with better channel conditions, and thus typically consider only the channel conditions on both the current paths and potential available paths as the factors for making a handover decision. Further, as used herein, a "path" comprises a satellite, a satellite beam and carrier frequency triplet, and a "sub-beam" refers to a satellite beam and carrier sub-band pair. According to further example embodiments, such approaches provide for the consideration of an expanded set of factors to achieve a more efficient and improved handover process. Such expanded factors, for example, are largely driven by the system characteristics (e.g., in a LEO system, the orbit in speed of the satellites, current and available transmission power levels, and available frequencies). Further, according to such embodiments, multiple paths can be selected to provide processing gain and/or diversity gain.

Figure 2:
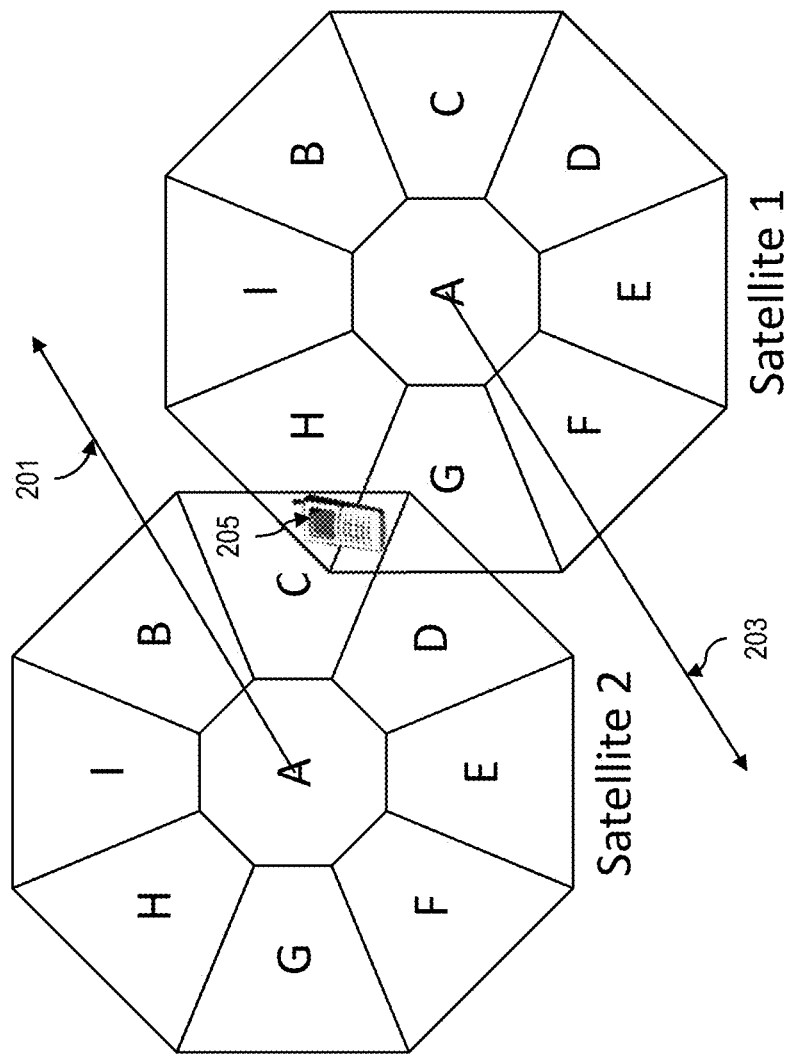
FIG. 2 illustrates a diagram depicting example beam patterns of two respective satellites moving in different directions, with a user terminal (UT) located in an overlapping section of the two beam patterns, in accordance with example embodiments of the present invention.

FIG. 2 illustrates a diagram depicting example beam patterns of two respective satellites, Satellite 1 (SAT-1) and Satellite 2 (SAT-2), moving in different directions, as reflected by the trajectory lines 201, 203. Each beam is label by an alphabet letter, and each beam may comprise multiple carrier frequencies. A user terminal (UT) 205 is shown, located in an overlapping section of the two beam patterns. The UT is located at the overlapping area of the satellite beams Satellite 1, Beam H and Satellite 2, Beam C, and, for example, can be serviced using multiple (e.g., two) paths to provide path diversity and processing gain, however, the beams must have the same operating carrier frequency. Alternatively (not depicted in the figure), adjacent beams of one satellite may overlap, and a terminal within the overlapping portion of two beams can be serviced by both beams simultaneously. In a GEO satellite communications system, where the satellite footprint on Earth is fixed, the UT may require handover due to its mobility, change of its channel conditions and sub-beam coverage.

According to example embodiments of the present invention, in a mobile satellite communications system, various different handover types may be performed. According to one example, a forward link handover may be initiated by the RAN, whereby it commands the UT to switch one or more of its downlink receive paths (forward link paths), and reconfigures the associated downlink transmit paths accordingly. By way of example, one type of forward link handover consists of a mobile-assisted handover. In a mobile-assisted handover, the RAN may use forward path measurement reporting procedures to obtain feedback on the quality of the target forward links. Mobile-assisted handovers are always intra-frequency (handovers involving common carrier frequency paths), but may involve inter-beam or inter-satellite path handover. A mobile-assisted handover may comprise ether a "soft" handover—where a change of one or more active paths is performed while at least one active path remains constant (when path diversity is in effect), or a "hard" handover, involving a reconfiguration of all active paths at the same time. By way of further example, another type of forward link handover consists of a blind handover. In a blind handover, no path measurements are used. Blind handovers may be performed in situations when measurements are unavailable or impossible to obtain (e.g., in inter-frequency handovers). Blind handovers are usually (if not always) hard handovers.

According to a further example, a return link handover may be initiated by the RAN, whereby it selects a different set of uplink receive paths (return link paths). By way of example, one type of return link handover consists of an intra-frequency handover (a handover involving common carrier frequency paths). Intra-frequency return link handovers are transparent to the UT, and require no message exchange between the RAN and the terminal. Intra-frequency return link handovers can be soft or hard. By way of further example, another type of return link handover consists of an inter-frequency handover (a handover involving change in carrier frequency paths). In an inter-frequency return link handover, the RAN commands the UT to switch its respective uplink frequency.

According to example handover approaches provided herein, path metrics are utilized to evaluate path options for different handover scenarios. For example, a Path Selection Metric (PSM) is a metric for a one path, and a Combined Path Metric (CPM) is a metric for a set of paths. Such metrics are used to evaluate existing radio links and to make decisions on whether to perform a handover and on selection of the appropriate set of paths for the handover.

Path Selection Metric (PSM):

According to example embodiments, the Path Selection Metric (PSM) is used in selecting the best candidate path, and seeks to combine various factors for evaluating one sub-beam over others.

By way of example, one type of PSM consists of a normalized relative pilot strength/quality metric (S). With such a pilot strength-quality PSM, when forward link pilot measurements are available (e.g., when the UT is tuned into a channel and able to measure certain characteristics of that channel), the relative pilot strength/quality metric utilizes the measurement of a pilot signal-to-interference ratio (SIR) or signal-to-noise ratio (S/N), plus a correction for differences in actual pilot transmit power between the forward link beams being measured. The pilot is a reference signal transmitted by the RAN, which is always on and being transmitted at a consistent transmit power. For example, the UT can measure the SIR for the current forward link channels or paths to which the UT is tuned into, and transmit those measurements back to the RAN. Such measurements can be performed using any generally known method for measurement of signal-to-interference ratio on such a mobile satellite communications channel or path. Based on the SIR measurements received from the UT, the RAN can then determine the relative pilot strength/quality (S), as follows:

$$S = (SIR_{pilt} - P_{pilot_{tx}} - S_{min})/S_{range} \quad (1)$$

For return link pilots, relative pilot strength/quality (S) consists of the measured pilot SIR (w/o the correction), normalized. For return link SIR measurements, the RAN performs such measurements directly based on return link transmissions received from the UT. Such measurements may be performed with respect to the active return link paths of the UT and/or other paths of the same frequency within beams (either from the same satellite or from a different satellite) covering the current UT position. While the RAN may not be decoding such other inactive paths, the RAN can receive the transmissions of the UT, and if a handover is initiated, then one or more of such inactive paths may become active. For return link pilots, relative pilot strength/quality (S), may be determined as follows:

$$S = (SIR_{pilot} - S_{min})/S_{range} \quad (2)$$

When forward or return link SIR measurements are not available for a candidate sub-beam, but measurements are available for a different sub-beam in the same satellite beam (e.g., in an inter-frequency handover—within the same beam, but to a different frequency path—the UT would be incapable of performing SIR measurements for a path of a different frequency), the available measurements for the different sub-beam may be used as an approximation for the desired sub-beam measurements. Similarly, when forward or return link SIR measurements are not available for a candidate beam, but measurements are available for a different beam (e.g., a different beam of the same satellite, but potentially to a different frequency path), then the available sub-beam measurements may be used as an approximation for the desired sub-beam measurements. The approximations, however, need to be adjusted for pilot transmit powers and beam gains—for example, the approximations may be determined as follows:

$$\text{Forward link beams: } SIR_{beam,B,approx} = SIR_{beam,A,meas} + G_{beam,B} - G_{beam,A} + P_{pilot,beam,B} - P_{pilot,beam,A} \quad (3)$$

$$\text{Return link beams: } SIR_{beam,B,approx} = SIR_{beam,A,meas} + G_{beam,B} - G_{beam,A} \quad (4)$$

These situations, where forward or return link measurements are not available, may occur in inter-frequency handovers and other blind handovers.

Figure 7:
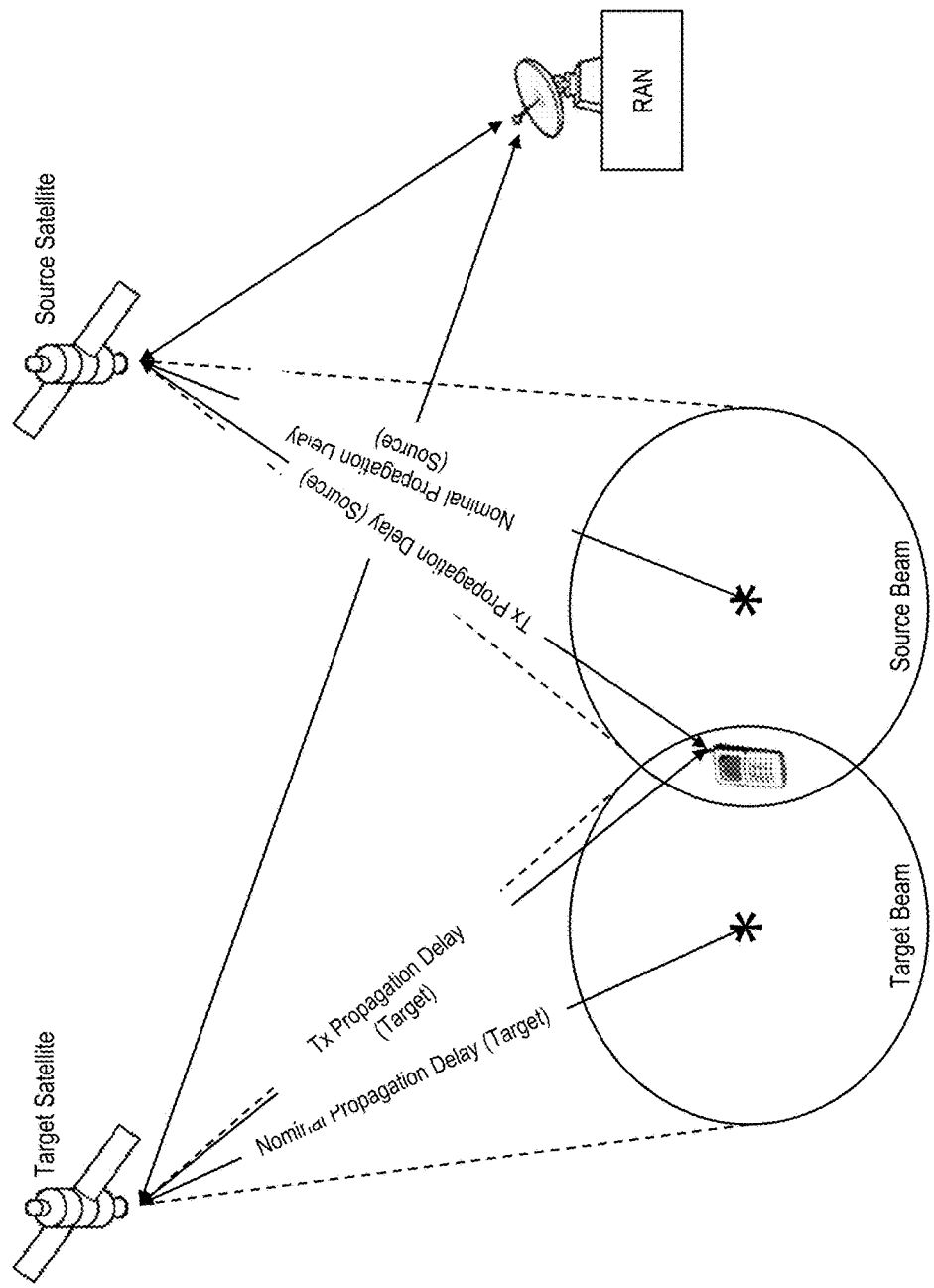
FIG. 7 illustrates a diagram depicting transmission propagation delays, for a user terminal (UT) handover situation in a TDMA wireless communications system, in accordance with example embodiments of the present invention.

When forward or return SIR measurements are not available for a candidate satellite (again, for example, when measurements cannot be made due to differing frequencies), but measurements are available for a beam on a different satellite, then the available sub-beam measurements may again be used as an approximation for the desired sub-beam measurements (e.g., after adding a path and beam gain offset due to the different distances between the UT and the two satellites, and (for example) a configurable handicap—See, e.g., FIG. 7)—for example, as follows:

$$\text{Forward link beams: } SIR_{beam,B,approx} = SIR_{beam,A,meas} + G_{beam,B} - G_{beam,A} + G_{path,B} - G_{path,A} + P_{pilot,beam,B} - P_{pilot,beam,A} + S_{adj} \quad (5)$$

$$\text{Return link beams: } SIR_{beam,B,approx} = SIR_{beam,A,meas} + G_{beam,B} - G_{beam,A} + G_{path,B} - G_{path,A} + S_{adj} \quad (6)$$

These situations, where forward or return SIR measurements are not available for a candidate satellite, may occur in inter-frequency handovers and other blind handovers. The configurable handicap comprises a flexible variable that provides additional control over the initiation of handovers (e.g., the handicap can be manipulated based on past experience, simulation results and desired system and operational goals with respect to handovers, such as frequency of handovers versus signal quality and resulting QoS).

In the above equations (1) to (6):

$P_{pilot,beam\_J}$ is the RAN pilot transmission power in beam J (dBW), $G_{beam\_J}$ is the service band beam antenna gain at the UT location for the beam J (dB), $G_{path,J}$=147.55−20 log(F×d)−240, which is the free space path loss in the mobile link for the beam J F is the service band carrier frequency (GHz), d is the slant range (km), $S_{min}$ is the expected minimum $S_{adj}$ is a configurable adjustment factor to account for other losses and to serve as an adjustable handicap (e.g., −3 dB). The handicap reflects an adjustable parameter for adjusting the estimations, for example, which may be determined based on past experience with the same or similar systems, simulations, design goals with respect to the frequency of handovers (e.g., aggressiveness as to the handover decision making), etc.

By way of further example, another type of PSM consists of a sub-beam lifetime metric (L). The sub-beam lifetime, with respect to a UT, is the length of time for which the sub-beam is likely to remain a viable physical path for the UT, which is derived based on the trajectory of the satellite and the respective beam coverage over the terminal position. For example:

$$\text{If subbeam lifetime} < L_{low}, \text{ then } L=0 \quad (7)$$

$$\text{If } L_{low} \leq \text{subbeam lifetime} \leq L_{high},$$

$$\text{then } L=(\text{subbeam lifetime} - L_{low})/(L_{high} - L_{low}) \quad (8)$$

$$\text{If subbeam lifetime} > L_{high}, \text{ then } L=1 \quad (9)$$

The value of $L_{low}$ and $L_{high}$ may be chosen to reflect beam coverage duration based on the particular satellite system (e.g., for a LEO system, 10 and 30 seconds, respectively). For example, based on system design (e.g., orbit and speed of the satellites, and beam patterns), $L_{low}$ and $L_{high}$ can be estimated, and, further, such estimations can be tailored to affect handover frequency (e.g., pushing the estimations more towards the system limits will reduce handover frequency, while more conservative estimates will result in a higher handover frequency). Moreover, $L_{low}$ and $L_{high}$ normalize the anticipated beam coverage time across the system.

By way of further example, another type of PSM consists of a handover bias metric (H). Handover bias may be used to delay handover until an appropriate (e.g., sufficiently better) path is found. For example, if the sub-beam is a current active path, then H=1, or if the sub-beam is a candidate path, then H=0.

By way of further example, another type of PSM consists of a metric reflecting an available capacity factor (or inverse load factor) for the sub-beam (A). An available capacity factor (or inverse of load factor) for the forward link sub-beam, for example, may be as follows:

$$A=1-P_{committed}/P_{max}, \quad (10)$$

where $P_{committed}$ reflects the current committed power and $P_{max}$ is the maximum power allowed in a sub-beam. Accordingly, the higher the committed power with respect to the maximum power, the capacity becomes more limited—until $P_{committed}=P_{max}$, and then A becomes zero. Further, an available capacity factor (or inverse load factor) for the return link sub-beam, for example, may be where A is based on the ratio of existing flows/uplink allocation to the maximum permissible channels, wherein more uplink flows or transmissions increases interference.

According to one embodiment, based on the foregoing example path selection metrics, the PSM may then be calculated, as follows:

$$PSM = K_S S + K_L L + K_H H + K_A A \quad (11)$$

where $K_S$, $K_L$, $K_H$ and $K_A$ provide different weights to the various metrics and system operation flexibility. By way of example, the weights may each be set according to a weight to be attributed to the respective metric to address the various system tradeoffs (such as, the weighting of the pilot measurements versus the sub-beam lifetime). In that regard, a higher weight applied to relative pilot strength/quality (S) may lead to a higher frequency of handovers (e.g., a better quality path may then trigger a handover even though there remains a relatively long lifetime for the sub-beam), whereas a higher weight applied to sub-beam lifetime (e.g., a better quality path may not then trigger a handover when there remains a relatively long lifetime for the sub-beam). Accordingly, with respect to the PSM determination, embodiments of the present invention provide a generic approach that can easily be tailored to accomplish different design and system goals and efficiencies (e.g., based on various system operational tradeoffs—such as minimizing handovers at the sacrifice of signal quality at the fringes versus maximizing signal quality on a consistent basis at the sacrifice of overhead associated with a higher frequency of handovers).

Combined Path Metric (CPM):

According to example embodiments, the Combined Path Metric (CPM) is used in selecting a set of candidate paths that provides good path diversity. A set of paths whose CPM is higher than that of another set is considered as a better choice for a set of diversity paths. By way of example, a CPM may be determined as follows. First, the PSM(i)=the PSM of the paths i, i=1, . . . , n (the PSM of each individual path i) is calculated as described above. Next, a path diversity parameter D(1, . . . , n) for the set of paths 1, . . . , n is selected based on the level of diversity of each path (e.g., where the diversity parameters favor a higher degree of path diversity—e.g., four satellites is better than 3, 2 or 1, for example, because of the increased line of sight options). The path diversity parameters, for example, may be selected as follows:

0.0 if n=1,
0.1 if n>1 and paths 1, . . . , n are on one satellite,
0.5 if n>1 and paths 1, . . . , n are on two satellites,
0.8 if n>1 and paths 1, . . . , n are on three satellites,
1.0 if n>1 and paths 1, . . . , n are on four satellites Then the CPM of the set of paths 1, . . . , n may be determined as follows:

$$CPM(1,\ldots,n) = 10*\log\left(\sum_{i=1}^{n} 10^{PSM(i)/10}\right) + K_D * D(1,\ldots,n) \quad (12)$$

where $K_D$ is a "diversity coefficient" (e.g., 3 dB), and thus ($K_D$*D(1, . . . , n)) creates a bias that favors increased satellite diversity. The diversity factor D(1, . . . , n) thereby reflects a flexible factor that can be set to meet system design objectives.

Selecting Paths Using CPM:

According to example embodiments, the following algorithm may be used to select the best set of paths from a candidate set of sub-beams using CPM, given a target number of diversity paths NP and satellites NS. Optionally, the target frequency TF may be supplied. First, sort the candidate list of sub-beams by decreasing PSM. Then, pick the candidate path sets for evaluation and select the optimal set based on the outcome of the evaluation, for example, as follows: (1) Pick the first N≤NP sub-beams such that (a) each sub-beam frequency is TF, (b) the SIR $S_i$ of each sub-beam (as used in the PSM computation) is within $\Delta S_{max}$ of that of the primary path, and (c) the candidate list span NS different satellites. Call this candidate set C(NS) and compute CPM(C(NS))—if NS satellites are not found, candidate set C(NS) will thus be empty and will not be considered; (2) Decrement NS and repeat (1) until candidate sets C(NS), C(NS−1), . . . , C(1) have been generated; and (3) Select the optimal candidate set as the set C(i) with the highest CPM value.

Forward Path Selection at Handover:

According to example embodiments, the RAN periodically reevaluates the set of forward path candidates and active paths. By way of example, the RAN may reevaluate the set of forward path candidates and active paths based on a predetermined periodicity (e.g., where the periodicity reflects another flexible factor utilized to achieve desired system operation and performance—e.g., every 10 seconds). By way of further example, the RAN may reevaluate the set of forward path candidates and active paths when certain events occur that may trigger a handover (e.g., such events include UT position updates, measurement reports, and certain resource management events—such as a resource management action that will render a beam no longer available to a particular UT).

According to further example embodiments, special criteria may apply when certain path handovers are being considered. By way of example, one such criteria may be that the selected carrier frequency must be the same as the other paths in the diversity set that are not being handed off. In case of an inter-frequency handover, all the diversity paths are handed off together. By way of further example, another such criteria for an inter-frequency handover, may be that (if reasonably possible) the target path must be on the same satellite as the existing path, which would allow the UT to use approximations based on current measurements to acquire the target pilots. By way of further example, a further such criteria for an inter-satellite handover may be that the target carrier frequency must be the same as the current one if at all possible. This allows the UT to perform measurements of the target pilots before the handover.

According to one embodiment, the forward path handover process is as follows:

Step I:

The handover process attempts to keep the active paths on the same frequency F1. Based on this goal of keeping the active paths on the same frequency F1, first, determine the list of candidates at the current active frequency F1 based on the latest pilot measurements reported by the UT and resulting computed PSMs for all of the paths. Then, apply the algorithm described above in the section titled "Selecting Paths Using CPM" to select the optimal set of paths, e.g., using certain options in the algorithm, as follows: Target frequency TF=F1 (the current frequency); Target number of paths NP=2 and Target number of satellites NS=2. The number of paths and number of satellites in this example are each 2, however, (as would be evident) other values may be utilized–for example, if no diversity is wanted or required due to system constraints or number of receivers at the terminal, the NP and NS could be set to 1. Further, the NP and NS values may be restricted by system characteristics (e.g., limitations on the number of independent path transmissions that a UT may be technically capable of receiving). Lastly, examine the determined optimal set, such that: (1) If the winners are the same as the current active paths, no handovers are required on this frequency; (2) If the winners are not the same as the current active paths, then examine the Combined Path Metric (CPM) of the winners; (3) If the CPM of the winners is greater than the CPM of the current active paths, then trigger the handover (i.e., this may be an intra-frequency soft handover if one winner is an active path, or an intra-frequency hard handover if neither winner is an active path); and (4) If the CPM of the winning set is lower than that of the active set, no handovers are required.

Step II:

In the cases where the previous step did not recommend a handover on the current frequency (examinations (1) and (4), from STEP I, immediately above), the active paths should be examined to see if a frequency handover is required, as follows. If the lifetime of each of the current active paths $L>L_{high}$ seconds, then no handovers are required. Otherwise, create a list of all sub-beams in "active" or "pending release" state on the current active path satellite(s) only, and compute their PSMs (include the current active paths in this list). Where no measurements are available for other frequencies, approximations may be used in the PSM calculations. Then, apply the algorithm described above in the section titled "Selecting Paths Using CPM" to select the optimal set of paths, e.g., using certain options in the algorithm, as follows: Target frequency TF=unspecified—the algorithm picks the frequency of the top candidate; Target number of paths NP=1; and Target number of satellites NS=1. The number of paths and number of satellites in this example are each 1, however, (as would be evident) other values may be utilized. Further, the NP and NS values may be restricted by system characteristics (e.g., limitations on the number of independent path transmissions that a UT may be technically capable of transmitting). Further, in this example, the UT may only be able to transmit on one path, but the RAN can receive that transmission on all paths of the same frequency and of beams covering the UT position. Lastly, examine the determined optimal set, such that: (1) If the winners have a higher CPM than the CPM of the current active paths, then perform an inter-frequency handover on the same satellite(s); (2) If a better set of paths was not found and the lifetime of each of the current active paths is $L \geq L_{low}$ seconds, then no handover is required; (3) Otherwise, an inter-satellite handover should be considered—repeat the above steps of creating a list of all sub-beams in "active" or "pending release" state on the current active path satellite(s), and computing their PSMs (include the current active paths in this list), but including sub-beams from other satellites in the list; (4) If a better set of paths is found, then perform an inter-frequency handover to a different satellite; and (5) If no better paths are found, then no handover is performed.

Return Path Selection at Handover:

According to example embodiments, at handover time, the RAN generally has measurements of multiple candidate paths provided by pilot searches during the course of the respective active call or data session. Further, with an active call or data session, an active traffic channel frequency has been established, so the RAN attempts to keep the UT on the same return frequency during handovers.

According to one embodiment, the RAN uses the following algorithm to choose the return paths at handover:

Step I:

In the return path selection, the handover process again attempts to keep the current active traffic frequency F1. Based on this goal of keeping the same active frequency F1, first, determine the candidate list of all the return sub-beams in the UT beam trajectory and sort them by decreasing PSM (where the actual measured pilot SIRs are used to calculate the PSMs). Then, apply the algorithm described above in the section titled "Selecting Paths Using CPM" to select the optimal set of paths, e.g., using certain options in the algorithm, as follows: Target frequency TF=F1 (the current frequency); Target number of paths NP=2; and Target number of satellites NS=2. The number of paths and number of satellites in this example are each 2, however, (as would be evident) other values may be utilized—for example, if additional diversity is required or desired to improve diversity gain or processing gain, then NP and NS could be set to 4. This number may also depend on the number of satellites visible to the UT and the size of the satellite constellation. Lastly, examine the determined optimal set, such that: (1) If the set of winners is the same as the current active set of return paths, then no handovers are required on this frequency; (2) If the set of winners differs from the current active set, then perform an intra-frequency return path reconfiguration, which may involve the addition, replacement or removal of one or more active paths.

Step II:

In the cases where the previous step did not recommend a handover on the current frequency F1 (examination (1), from STEP I, immediately above), the active paths should be examined to see if a frequency handover is required, as follows. If the lifetime of at least two of the current active paths is L>$L_{high}$ seconds, then no handovers are required. This is done because the path selection can be attempted again, for example, after 10 seconds, by which time better candidates might become available. Otherwise, create a list of all sub-beams on the current active path satellite(s) only and compute their PSMs (including the current active paths in this list). Where no measurements are available for other frequencies, the measurements on the current active frequency may be used as an approximation in the PSM calculations. Then, apply the algorithm described above in the section titled "Selecting Paths Using CPM" to select the optimal set of paths, e.g., using certain options in the algorithm, as follows: Target frequency TF=unspecified—the algorithm picks the frequency of the top candidate; Target number of paths NP=2; and Target number of satellites NS=2. The number of paths and number of satellites in this example are each 2, however, (as would be evident) other values may be utilized—for example, if additional diversity is required or desired to improve diversity gain or processing gain, then NP and NS could be set to 4. This number may also depend on the number of visible satellites to the terminal and the size of the satellite constellation. Lastly, examine the determined optimal set, such that: (1) If the winners have a higher CPM than the CPM of the current active paths, then perform an inter-frequency return handover on the same satellite(s); (2) If a better set of paths was not found and the lifetime of at least two of the current active paths is L≥$L_{low}$ seconds, then no handovers are required at this time; (3) Otherwise, an inter-satellite handover should be considered—repeat the above steps of creating a list of all sub-beams on the current active path satellite(s) and compute their PSMs (including the current active paths in this list), but including sub-beams from other satellites in the list; (4) If a better set of paths is found, then perform an inter-frequency return handover to a different satellite; and (5) If no better paths are found, then no handover is performed.

Figure 3:
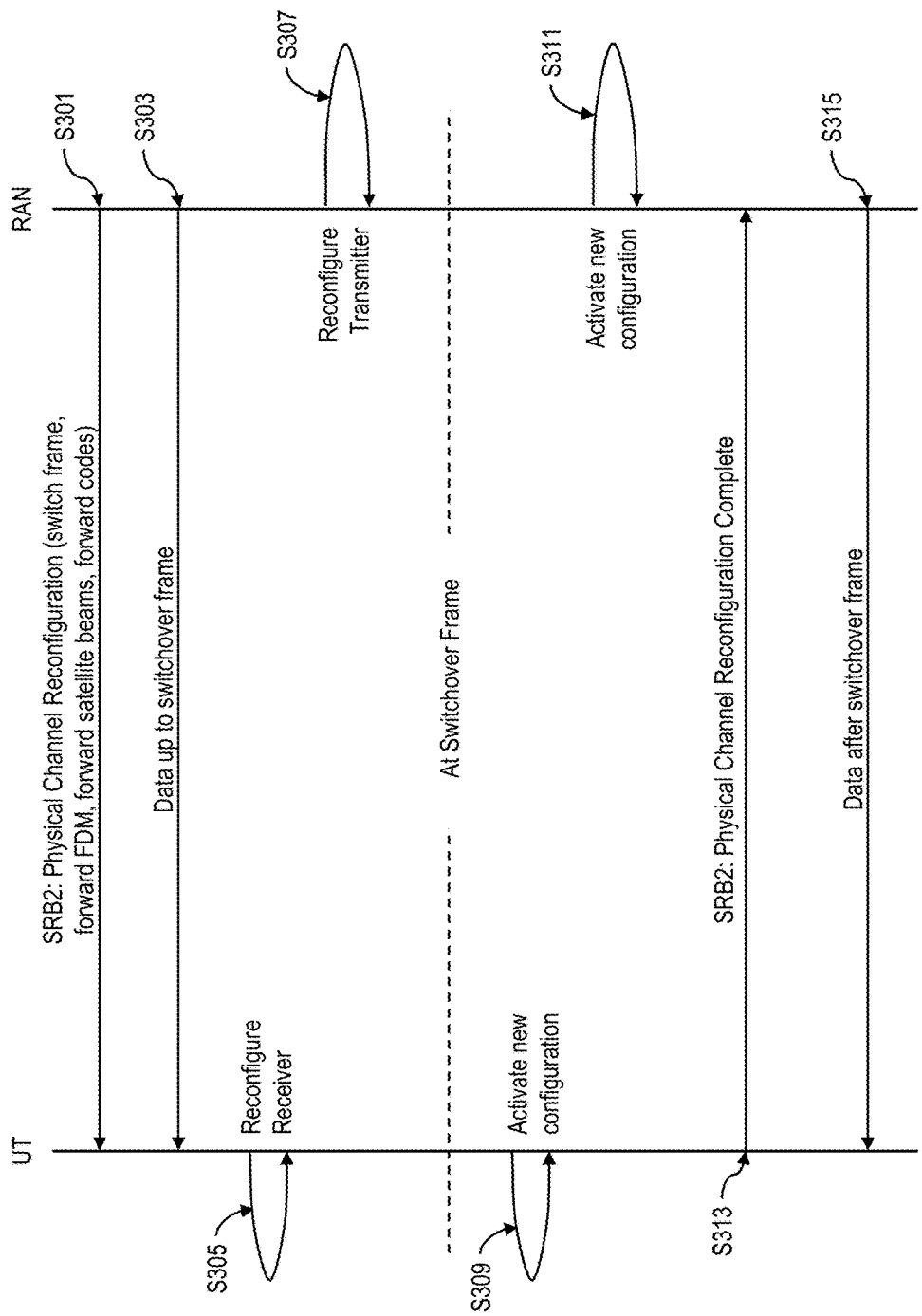
FIG. 3 illustrates a signal timing diagram depicting a process for physical channel reconfiguration of forward paths or frequencies, for a user terminal (UT) handover situation in a CDMA wireless communications system, in accordance with example embodiments of the present invention.

CDMA Handover Procedure:

In accordance with further example embodiments, processes for handover in a CDMA system are provided. FIG. 3 illustrates a signal timing diagram depicting a process for physical channel reconfiguration of forward paths or frequencies, for a user terminal (UT) handover situation in a CDMA wireless communications system, in accordance with example embodiments of the present invention. By way of example, for a forward link handover, the RAN provides certain information to instruct the UT to perform the handover (S301), including identification of the satellite, beam and carrier frequency, the Walsh codes, and the switchover time (e.g., specification of the forward frame number at which the RAN and terminal switch to the new paths). The satellite and beam information provide the proper mapping to a pseudorandom noise (PN) code to be used by the terminal. When forward path diversity is being used, the reconfiguration can include information of multiple paths. The frequency is generally the same for all paths. With diversity in use, a soft handover involves the reconfiguration of some paths while maintaining at least one active path, whereas hard handover involves the reconfiguration of all active paths. The RAN continues to transmit data on the old paths up to the target switchover frame (S303). The UT the reconfigures the receiver (S305), and the RAN reconfigures the transmitter (S307). Depending on the type of reconfiguration (e.g., change of downlink frequency), the RAN may pause downlink traffic for a short while during the transition to allow the UT reconfiguration to be activated. Then, at the switchover frame, the UT activates the new configuration (S309) and the RAN activates the new configuration (S311). The UT then sends a message to the RAN indicating that the physical channel reconfiguration has been completed (S313), and the RAN continues to send the data (after the switchover frame) based on the new configuration (S315).

Figure 4:
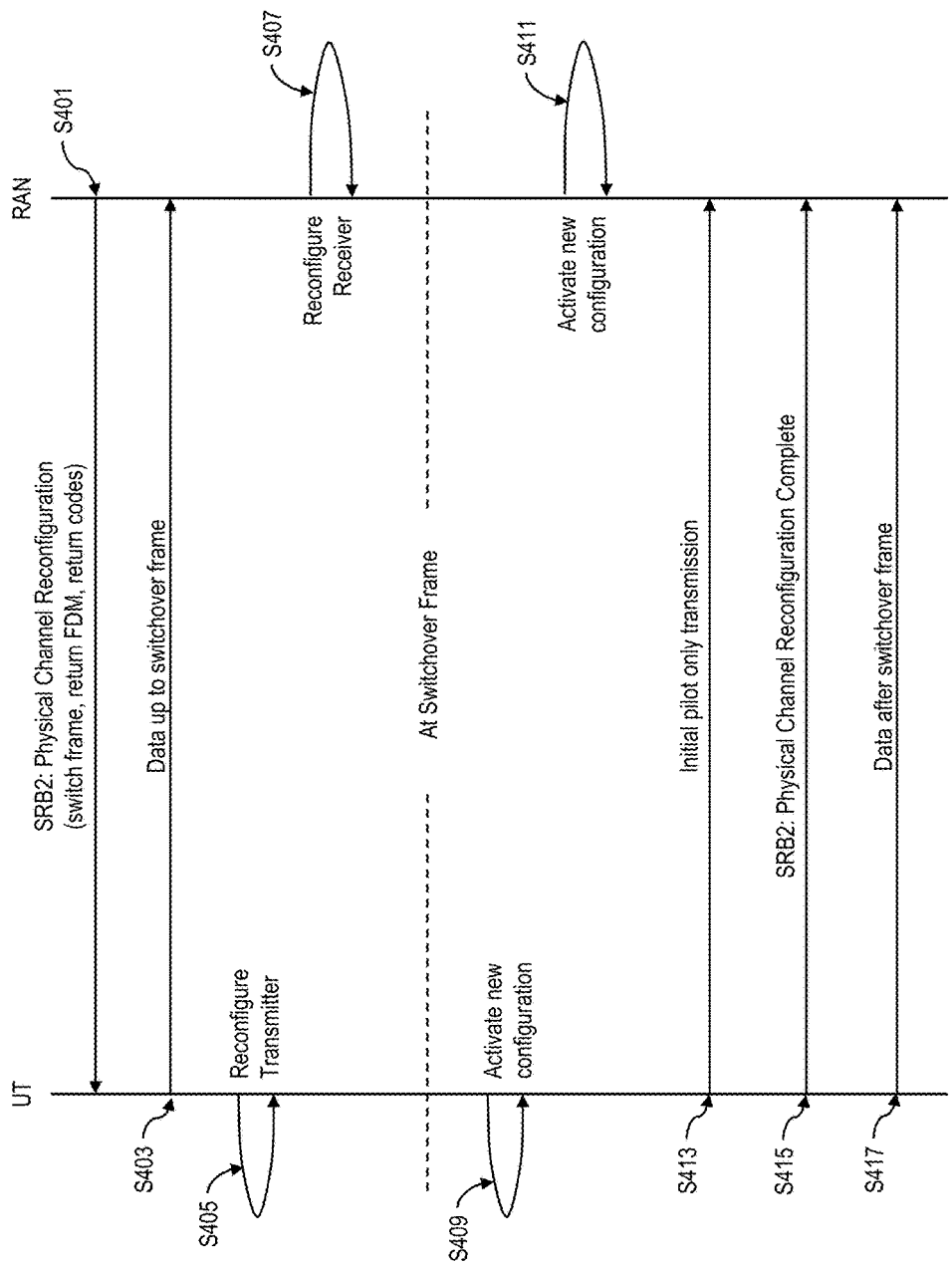
FIG. 4 illustrates a signal timing diagram depicting a process for physical channel reconfiguration of return paths or frequencies, for a user terminal (UT) handover situation in a CDMA wireless communications system, in accordance with example embodiments of the present invention.

FIG. 4 illustrates a signal timing diagram depicting a process for physical channel reconfiguration of return paths or frequencies, for a user terminal (UT) handover situation in a CDMA wireless communications system, in accordance with example embodiments of the present invention. By way of further example, for a return link handover, the RAN provides information to instruct the UT to perform the handover (S401). The UT transmissions on the assigned return frequency are received by the RAN via diverse paths (satellites and beams). The active RAN receivers and path diversity are transparent to the user. Further, the Walsh codes to be used on return physical channels may be included in the PCR/RBR message, if they are to be changed. Normally, there is no need to change return channel Walsh code assignments because they are independent of the return sub-beam. The UT continues to transmit data on the old paths up to the target frame (S403). The UT the reconfigures the transmitter and (S405), and the RAN reconfigures the receiver (S407). Then, at the switchover frame, the UT activates the new configuration (S409) and the RAN activates the new configuration (S411). The UT then sends an initial pilot only transmission (S413), and then sends a message to the RAN indicating that the physical channel reconfiguration has been completed (S315). The UT then continues to send the data (after the switchover frame) based on the new configuration (S417).

TDMA System Handover Procedure

Figure 5:
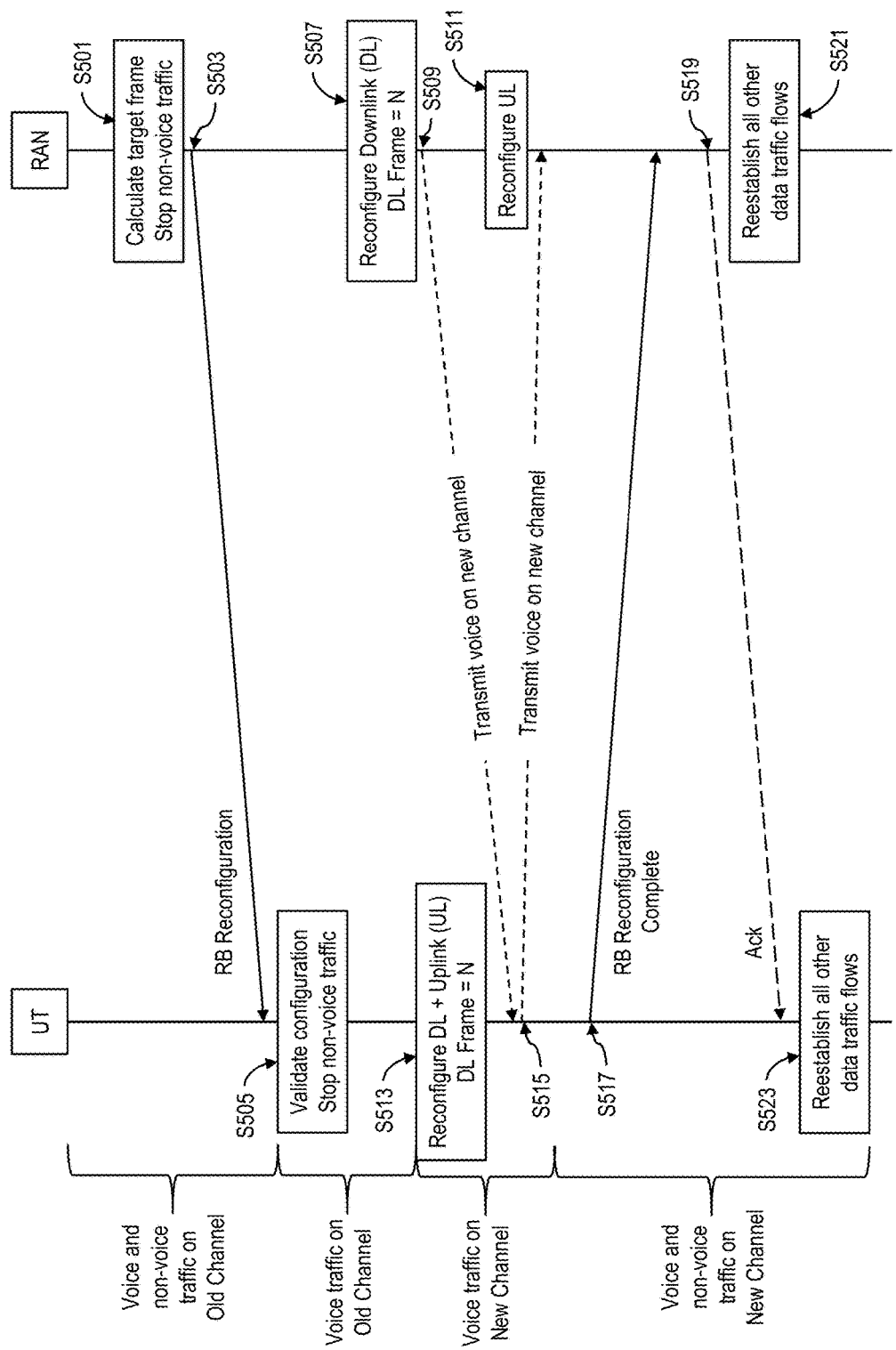
FIG. 5 illustrates a signal timing diagram depicting a process for physical channel reconfiguration of forward and return paths or frequencies, for a user terminal (UT) handover situation in a TDMA wireless communications system, in accordance with example embodiments of the present invention.

In accordance with further example embodiments, processes for handover in a TDMA system are provided. In a TDMA system, the forward and return beam patterns are assumed to be identical and overlapping. FIG. 5 illustrates a signal timing diagram depicting a process for physical channel reconfiguration of forward and return paths or frequencies, for a user terminal (UT) handover situation in a TDMA wireless communications system, in accordance with example embodiments of the present invention. For System operation, each forward sub-beam has a corresponding uplink sub-beam and thus the handover applies to the forward and return frequencies simultaneously. By way of example, to instruct the UT to perform a handover, the RAN provides certain information to the UT via the Radio Bearer (RB) Reconfiguration message (S503), including forward carrier frequency, return carrier frequency and switchover time (e.g., specification of the forward link frame number at which the RAN and UT switch to the new paths). Prior to the RB reconfiguration message, the RAN computes a switch time (e.g., a downlink activation time=N) for the reconfiguration (S501). This establishes a downlink frame number-based reference point in time. For example, the target downlink frame number N is chosen such that sufficient time is allowed for the RAN to retransmit the RB Reconfiguration message, and the uplink activation frame is based on the satellite hop delay. The RAN continues to transmit and receive voice packets on the old channels until the downlink (DL) frame N is reached, but (S501) the RAN stops transmitting and receiving data traffic for all the other flows that rely on sequence number and segmentation information to reconstruct upper layer packet data units (PDUs). The last successfully received sequence numbers that resulted in a full upper layer packet assembly are also sent to the UT in the reconfiguration message in order to keep the RAN and UT segmentation/reassembly states in synch. When the UT receives the RB reconfiguration command, it validates the configuration and stops all data traffic flows until DL frame N (except voice flow, if present) (S505). When the DL frame N is reached at the RAN, it reconfigures the downlink physical channel according to the new configuration and starts transmitting bursts on the new DL channel (S507). At this point, the RAN can begin transmitting voice packets on the new downlink channel (S509), space and reconfigures the uplink channel (S511). Similarly at DL frame N, the UT reconfigures both the downlink and uplink physical channels and starts transmitting on the new uplink physical channel (S513). At this point, the UT continues transmission of voice packets (if present) on the new uplink channel (S515). The UT then transmits an RB reconfiguration complete message to the RAN, using the new uplink channel (S517). When the RB reconfiguration complete message is received at the RAN, the RAN acknowledges the message (S519) and reestablishes all the other data traffic flows (S521). Finally, the UT reestablishes all other data traffic flows (S523).

TDMA System Satellite Handover

Figure 6:
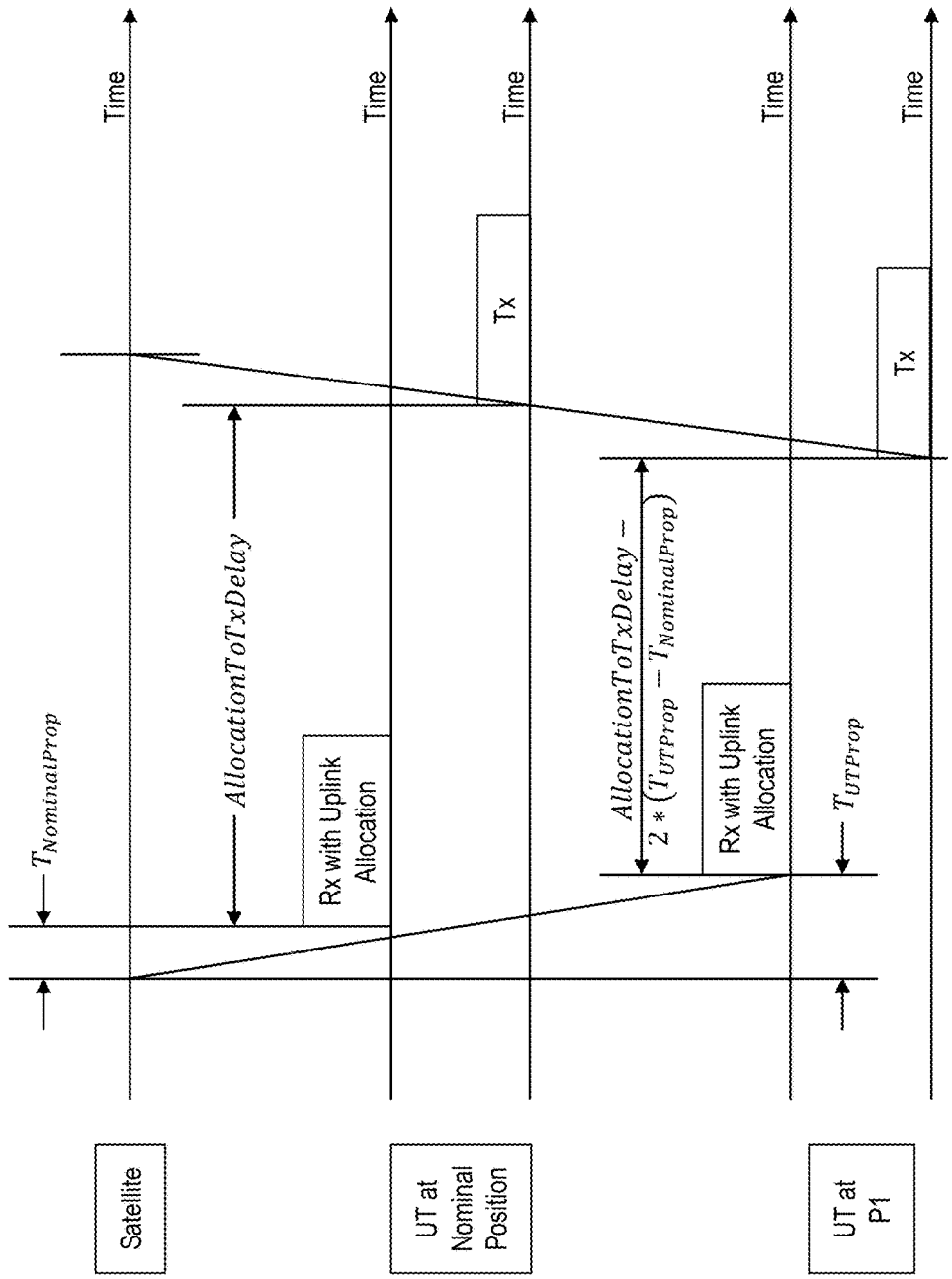
FIG. 6 illustrates a timing diagram of uplink allocation to transmissions in relation to nominal positions, for a user terminal (UT) handover situation in a TDMA wireless communications system, in accordance with example embodiments of the present invention.

In TDMA systems, all the UTs need to be synchronized so their transmissions are properly aligned at the satellite and do not overlap in time. In an example embodiment, the synchronization is based on a nominal point on the surface of the earth, for example the center of the beam. FIG. 6 illustrates a timing diagram of uplink allocation to transmissions in relation to nominal positions, for a user terminal (UT) handover situation in a TDMA wireless communications system, in accordance with example embodiments of the present invention. FIG. 7 illustrates a diagram depicting transmission propagation delays, for a user terminal (UT) handover situation in a TDMA wireless communications system, in accordance with example embodiments of the present invention. With reference to FIG. 6, the timing ensues so that all transmissions from the UTs arrive aligned at the satellite. By way of example, let TNominalProp be the transmission propagation time between the satellite and the nominal point, and let AllocationToTxDelay be the time between receiving an uplink allocation and uplink transmission for a UT at the nominal point. Thus, a UT at a position P1, with transmission propagation delay of TUTProp to the satellite, will set its AllocationToTxDelay(UT1) as AllocationToTxDelay(UT1)=AllocationToTxDelay−2*($T_{UTProp}$−$T_{NominalProp}$).

Both AllocationToTxDelay and ($T_{UTProp}$−$T_{NominalProp}$) are usually provided by the RAN to the UT during initial system access using RACH procedure, where ($T_{UTProp}$−$T_{NominalProp}$) is calculated either using the UT location sent in RACH, or using the RACH arrival time and comparing with the expected RACH arrival time from the nominal location. When a UT needs a handover to a different satellite, the synchronization at the UT needs to be updated to reflect the UT to the target satellite propagation delay, the target satellite nominal point on earth and its AllocationToTxDelay value. The AllocationToTxDelay parameter is usually different for each beams/satellite set. In order to achieve this, the RAN uses a UT position and the satellite ephemeris data to calculate the following parameters, which are sent in a handover message along with the new forward and return frequencies:

TxPropagationDelayUpdate=TxPropagationDelay (Target)−TxPropagationDelay(Source) and (13)

PropagationDelayDiffWithNominal(Target)=TxPropagationDelay(Target)−NominalPropagationDelay (Target) (14)

Based on TxPropagationDelayUpdate, the UT can synchronize to the new downlink traffic channel without using the downlink frequency channel, and based on PropagationDelayDiffWithNominal(Target), the UT can update its AllocationToTxDelay value to AllocationToTxDelay(Target)−2*PropagationDelayDiffWithNominal(Target)—See, e.g., FIG. 7.

Figure 8:
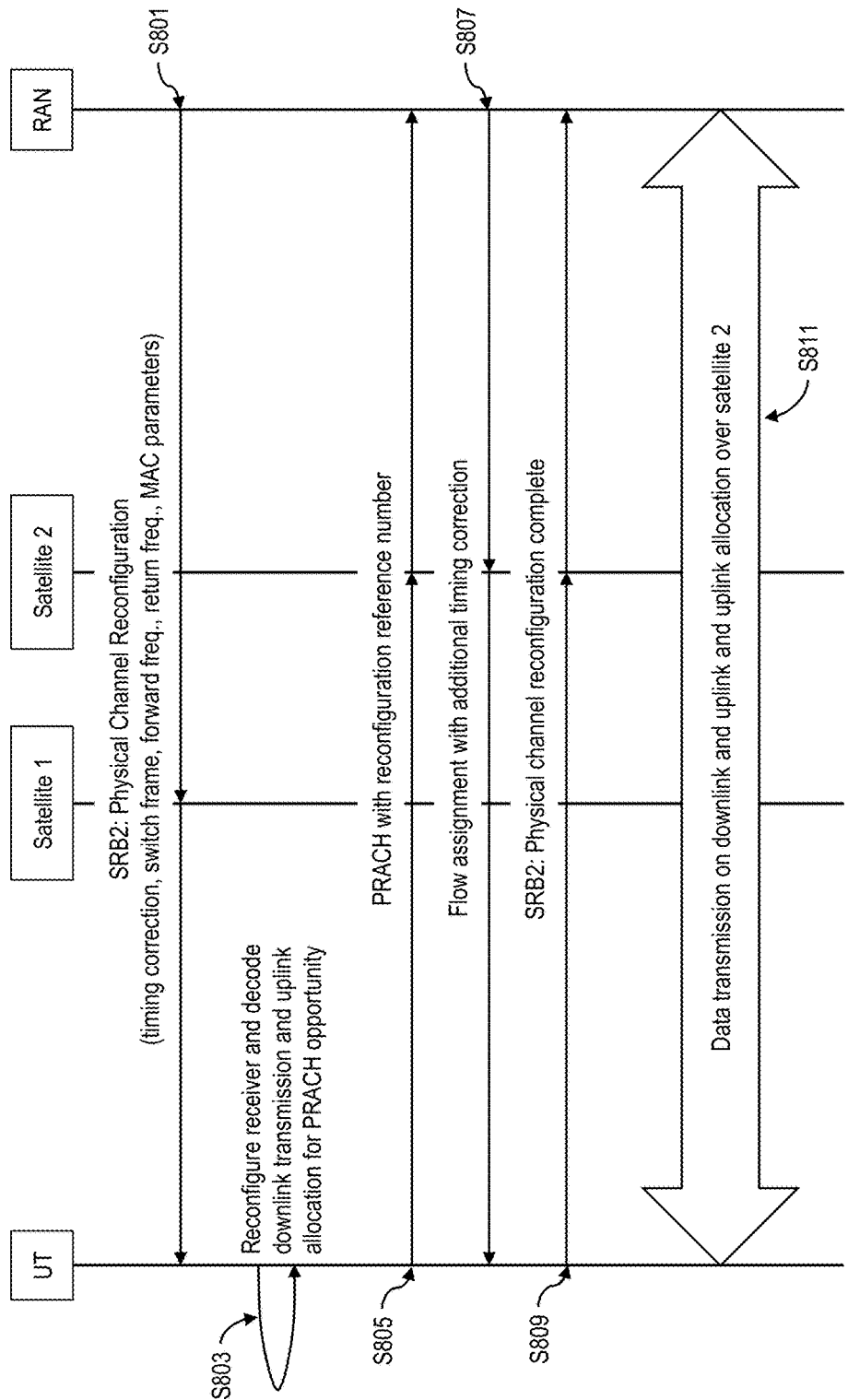
FIG. 8 illustrates a signal timing diagram for an inter-satellite handover process, for a user terminal (UT) handover situation in a TDMA wireless communications system, in accordance with example embodiments of the present invention.

FIG. 8 illustrates a signal timing diagram for an inter-satellite handover process, for a user terminal (UT) handover situation in a TDMA wireless communications system, in accordance with example embodiments of the present invention. With reference to FIG. 8, the flow reflects a handover between two satellites (handover from satellite 1 to satellite 2). By way of example, after the initial handover instruction (S801), the UT reconfigures its receiver (switching to the new frequencies), and decodes the downlink traffic channel on the new frequency (S803). Using the newly adjusted timing correction (e.g., AllocationToTxDelay), the UT transmits an uplink PRACH to access the system using the traffic channel S805). PRACH allocations are signaled in the downlink transmission similar to the allocation of uplink data transmission. Initial access with PRACH allows the RAN to instruct the UT to make additional timing adjustment to correct for residual timing errors. The PRACH also carries a handover message instruction reference number to help the RAN locate the UT context. After the UT receives the flow assignment from the RAN (S807), the UT sends a Physical Channel Complete message and reactivates all the flows that were handed over (S809). The use of PRACH has a less stringent timing and synchronization requirement than the use of traffic channel. If, however, the RAN deems that the timing accuracy is sufficient for the UT to use the traffic channel immediately, then the RAN will instruct the UT not to send PRACH first, and to immediately use the traffic channel and listen to uplink allocation to transmit Physical Channel Complete message. Then, data transmissions continue on the downlink and uplink over satellite 2 (S811).

Figure 9:
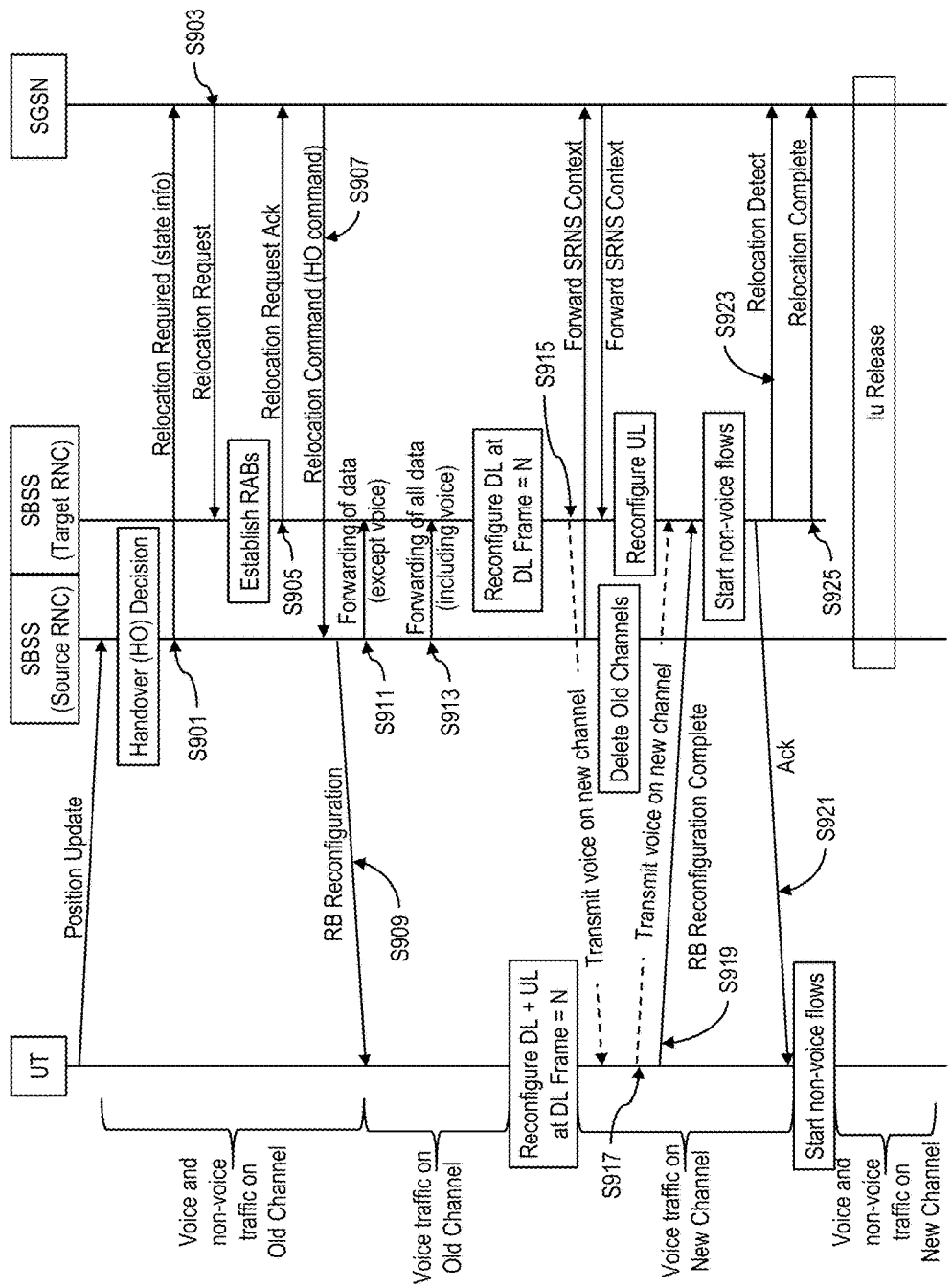
FIG. 9 illustrates a signal timing diagram depicting an inter-RNC handover process, for a user terminal (UT) handover situation in a wireless communications system, in accordance with example embodiments of the present invention.

Handover with Radio Network Controller (RNC) Relocation:

In accordance with example embodiments, a handover with RNC relocation process is used to perform seamless handover of a UT and the UT active sessions from one radio network controller (RNC) to another. FIG. 9 illustrates a signal timing diagram depicting an inter-RNC handover process, for a user terminal (UT) handover situation in a wireless communications system, in accordance with example embodiments of the present invention. The RNC is a governing element in a Universal Mobile Telecommunications System (UMTS) radio access network, and is generally responsible for controlling the connected for servicing the respective UTs. The RNC generally performs radio resource management functions, some mobility management functions and is the encryption point for user data traffic. By way of example, The inter-RNC handover is triggered by position knowledge of fixed UT or by position updates or neighbor beam measurements sent by the UT from which the RAN determines that the UT has crossed into the target beam.

According to an example embodiment, the process is performed as follows:

First Relocation Preparation is performed. By way of example, for the relocation preparation, the source RNC sends a Radio Access Network Application Part (RANAP) Relocation Required message to the SGSN containing the necessary context information for all the protocol layers from the radio access bearer (RAB) information down to the physical layer (S901). The SGSN augments this with RAB information available in the core network, and sends it in the Relocation Request message to the target RNC (S903), for example, which may include: UT identification, network access stratum (NAS) mobility and routing information and RAB parameters (e.g., QoS and GTP-U information). The Relocation Required message generated by the source RNC contains a "Source RNC to Target RNC Transparent Container," which should be sufficient for the target RNC to allocate physical layer resources and reconstruct the upper layer configuration and state for the handover. The Source RNC to Target RNC Transparent Container, for example, includes: an integrity protection key, state information and chosen algorithm, a ciphering key, state information and chosen algorithm, UT radio access capabilities and UT Type, UT position, and RAB and radio bearer (RB) information (RAB Id, RB Id, packet data convergence protocol (PDCP) configuration information, radio link control (RLC) configuration). With the receipt of the RANAP Relocation Request message, the target RNC performs admission control and resource allocation for the RABs being handed off (establishes the RABs), and sends a Relocation Request Ack message back to the SGSN (S905). Having assigned physical channels to the UT in handover, the target gateway (GW) constructs a RB Reconfiguration message containing the complete configuration required to execute the handover, and embeds it within a "Target RNC to Source RNC Transparent Container" in the Relocation Request ACK sent to the SGSN, which, for example, includes: the downlink frame number N, new forward and return physical channel configuration along with any required synchronization parameters, RB configuration, PDCP information, new AS and NAS mobility information and identifiers (GRA, RA, U-RNTI), and key BCCH SI parameters for the target beam. The SGSN forwards the handover command from the target RNC through to the source RNC, embedding it in the Relocation Command message (S907).

Second, Handover Execution is performed. By way of example, for the execution of the handover, the source RNC triggers the handover process by stopping all non-voice traffic flows and sending the handover command (the RB Reconfiguration message received from the Target RNC via the CN) to the UT (S909). Voice traffic flow continues until the target downlink (DL) frame number N is reached. The source RNC computes a switch time (e.g., downlink activation time=N) for the reconfiguration, which establishes a DL frame number-based reference point in time. The target DL frame number N is chosen such that sufficient time is allowed for the RAN to retransmit the RB Reconfiguration message. The uplink (UL) activation frame is based on the satellite hop delay. The RNC continues to transmit and receive voice packets on the old channels until the DL frame N is reached. The RNC stops transmitting and receiving data traffic for all the other flows that rely on sequence number and segmentation information to reconstruct upper layer packet data units (PDUs). The last successfully received sequence numbers that resulted in a full upper layer packet assembly are also sent to the UT in the reconfiguration message in order to keep the RAN and UT segmentation/reassembly states in synch. When the UT receives the RB Reconfiguration command, it stops all data traffic flows until downlink frame N, except voice flow if present. Non-voice data that is queued and received is forwarded toward the target RNC (S911). This data will be queued at the target RNC until the reestablishment of non-voice flows (e.g., the end of the reconfiguration procedure). At the activation frame N, voice packets are also forwarded to the target RNC (S913) to be sent on the newly configured channel. The CN starts forward data to the target RNCS at a later stage when relocation is detected and completed. Thus, by forwarding voice traffic at the activation frame as well, minimal voice traffic interruption is experienced by the UT.

When the DL frame N is reached at the target RNC, it reconfigures the downlink physical channel according to the new configuration and starts transmitting voice traffic on the new downlink channel to the UT. At this point, voice packets are transmitted on the new DL channel (S915). Similarly at DL frame N, the UT reconfigures both the downlink and uplink physical channels and starts transmitting on the new uplink physical channel (S917). At this point, the UT continues transmission of voice packets, if present, on the new uplink channel to the target RNC. Based on the downlink activation frame and the uplink activation time at the UT, the target RNC configures the new uplink physical channel and begins to acquire the UT uplink voice packets transmission. The UT then transmits an RB Reconfiguration Complete message to the target RNC, using the new uplink channel (S919). When the RB Reconfiguration Complete message is received at the target RNC, it acknowledges the message and reestablishes all active data traffic flows on the downlink (S921). When the target RNC receives the RB Reconfiguration Complete message from the UT, it acknowledges it and reestablishes all the other data traffic flows on the DL. The target RNC sends the Relocation Detect (S923) and Relocation Complete messages (S925) to the SGSN, and the SGSN then switches the user data plane GTP traffic to the target RNC. When the UT receives the layer 2 acknowledgement for the RB Reconfiguration Complete message, the UT reestablishes all the other data traffic flows on the uplink.

Figure 10:
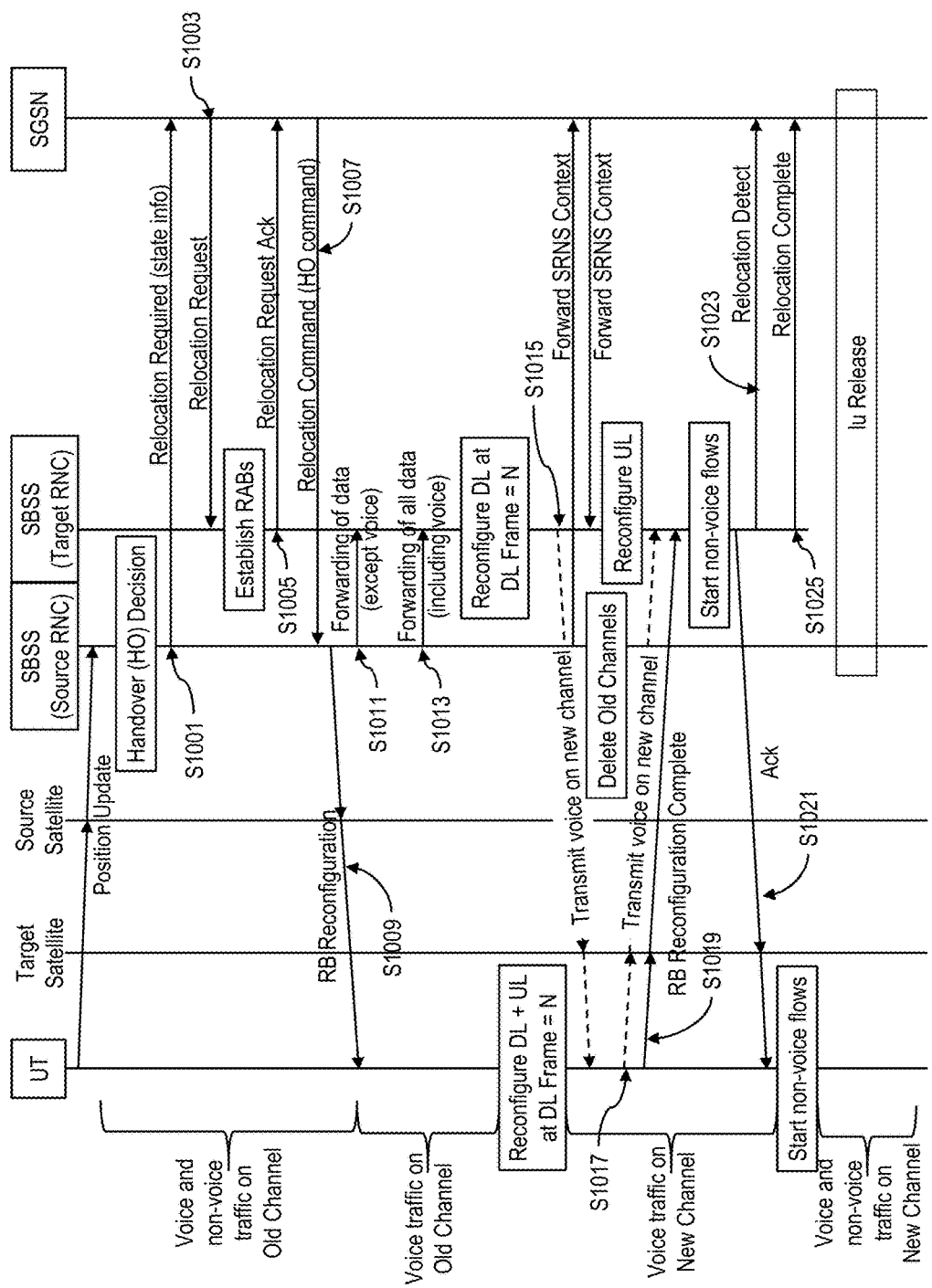
FIG. 10 illustrates a signal timing diagram depicting an inter-RNC and inter-satellite handover process, for a user terminal (UT) handover situation in a wireless communications system, in accordance with example embodiments of the present invention.

Inter-Satellite Handover with Radio Network Controller (RNC) Relocation:

In accordance with example embodiments, an inter-satellite handover with RNC relocation process is used for handover of a UT from a current satellite (source satellite) to a new satellite (target satellite), and handover of the UT and the UT active sessions from a current RNC (source RNC) to another RNS (target RNC). FIG. 10 illustrates a signal timing diagram depicting an inter-RNC and inter-satellite handover process, for a user terminal (UT) handover situation in a wireless communications system, in accordance with example embodiments of the present invention. The figure shows the interaction between the various entities and over which satellite the messages are exchanged. This handover process operates virtually the same as the process detailed above for a handover with radio network controller (RNC) relocation, with respect to FIG. 9, except that certain message and data transmissions are relayed either over the source satellite or the target satellite, which satellite relays are reflected by the signal arrows in FIG. 10 (i.e., where a message or data transmission signal arrow points to a one of the satellites, and then continues on to the destination, that message or data transmission signal is being relayed over the respective satellite).

According to an example embodiment, the process is performed as follows:

First Relocation Preparation is performed. By way of example, for the relocation preparation, the source RNC sends a Radio Access Network Application Part (RANAP) Relocation Required message to the SGSN containing the necessary context information for all the protocol layers from the radio access bearer (RAB) information down to the physical layer (S1001). The SGSN augments this with RAB information available in the core network, and sends it in the Relocation Request message to the target RNC (S1003), for example, which may include: UT identification, network access stratum (NAS) mobility and routing information and RAB parameters (e.g., QoS and GTP-U information). The Relocation Required message generated by the source RNC contains a "Source RNC to Target RNC Transparent Container," which should be sufficient for the target RNC to allocate physical layer resources and reconstruct the upper layer configuration and state for the handover. The Source RNC to Target RNC Transparent Container, for example, includes: an integrity protection key, state information and chosen algorithm, a ciphering key, state information and chosen algorithm, UT radio access capabilities and UT Type, UT position, and RAB and radio bearer (RB) information (RAB Id, RB Id, packet data convergence protocol (PDCP) configuration information, radio link control (RLC) configuration). With the receipt of the RANAP Relocation Request message, the target RNC performs admission control and resource allocation for the RABs being handed off (establishes the RABs), and sends a Relocation Request Ack message back to the SGSN (S1005). Having assigned physical channels to the UT in handover, the target gateway (GW) constructs a RB Reconfiguration message containing the complete configuration required to execute the handover, and embeds it within a "Target RNC to Source RNC Transparent Container" in the Relocation Request ACK sent to the SGSN, which, for example, includes: the downlink frame number N, new forward and return physical channel configuration along with any required synchronization parameters, RB configuration, PDCP information, new AS and NAS mobility information and identifiers (GRA, RA, U-RNTI), and key BCCH SI parameters for the target beam. The SGSN forwards the handover command from the target RNC through to the source RNC, embedding it in the Relocation Command message (S1007).

Second, Handover Execution is performed. By way of example, for the execution of the handover, the source RNC triggers the handover process by stopping all non-voice traffic flows and sending the handover command (the RB Reconfiguration message received from the Target RNC via the CN) to the UT (S1009)—which is relayed via the source satellite. Voice traffic flow continues until the target downlink (DL) frame number N is reached. The source RNC computes a switch time (e.g., downlink activation time=N) for the reconfiguration, which establishes a DL frame number-based reference point in time. The target DL frame number N is chosen such that sufficient time is allowed for the RAN to retransmit the RB Reconfiguration message. The uplink (UL) activation frame is based on the satellite hop delay. The RNC continues to transmit and receive voice packets on the old channels until the DL frame N is reached. The RNC stops transmitting and receiving data traffic for all the other flows that rely on sequence number and segmentation information to reconstruct upper layer packet data units (PDUs). The last successfully received sequence numbers that resulted in a full upper layer packet assembly are also sent to the UT in the reconfiguration message in order to keep the RAN and UT segmentation/reassembly states in synch. When the UT receives the RB Reconfiguration command, it stops all data traffic flows until downlink frame N, except voice flow if present. Non-voice data that is queued and received is forwarded toward the target RNC (S1011). This data will be queued at the target RNC until the reestablishment of non-voice flows (e.g., the end of the reconfiguration procedure). At the activation frame N, voice packets are also forwarded to the target RNC (S1013) to be sent on the newly configured channel. The CN starts forward data to the target RNCS at a later stage when relocation is detected and completed. Thus, by forwarding voice traffic at the activation frame as well, minimal voice traffic interruption is experienced by the UT.

When the DL frame N is reached at the target RNC, it reconfigures the downlink physical channel according to the new configuration and starts transmitting voice traffic on the new downlink channel to the UT. At this point, voice packets are transmitted on the new DL channel (S1015)—which is relayed over the target satellite. Similarly at DL frame N, the UT reconfigures both the downlink and uplink physical channels and starts transmitting on the new uplink physical channel (S1017)—which is relayed over the target satellite. At this point, the UT continues transmission of voice packets, if present, on the new uplink channel to the target RNC. Based on the downlink activation frame and the uplink activation time at the UT, the target RNC configures the new uplink physical channel and begins to acquire the UT uplink voice packets transmission. The UT then transmits an RB Reconfiguration Complete message to the target RNC, using the new uplink channel (S1019), relayed over the target satellite. When the RB Reconfiguration Complete message is received at the target RNC, it acknowledges the message and reestablishes all active data traffic flows on the downlink (S1021)—which is relayed over the target satellite. When the target RNC receives the RB Reconfiguration Complete message from the UT, it acknowledges it and reestablishes all the other data traffic flows on the DL. The target RNC sends the Relocation Detect (S1023) and Relocation Complete messages (S1025) to the SGSN, and the SGSN then switches the user data plane GTP traffic to the target RNC. When the UT receives the layer 2 acknowledgement for the RB Reconfiguration Complete message, the UT reestablishes all the other data traffic flows on the uplink.

In the preceding specification, various embodiments have been described with reference to the accompanying drawings. It will, however, be evident that various modifications may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method for handover of a user terminal (UT) from a source satellite to a target satellite in a satellite communications network, comprising:

receiving, by the UT, an initial handover message from a radio access network (RAN) node of the satellite communications network, wherein the initial handover message includes a target frequency for receiving downlink data transmissions from the RAN node via the target satellite and a timing correction;

reconfiguring a receiver of the UT for receipt of the downlink data transmissions, from the target satellite, via the target frequency;

decoding the downlink data transmissions to determine allocations for a physical random access channel (PRACH) of the target satellite provided by the downlink data transmissions;

transmitting a reply handover message to the RAN node, via the PRACH channel of the target satellite, using the timing correction included in the handover message;

receiving, by the UT, a flow assignment message from the RAN, via the downlink data transmissions of the target satellite;

reactivating, by the UT, hand-over data flows for transmission and receipt via the target satellite; and transmitting a channel configuration complete message to the RAN node, via the PRACH channel of the target satellite, using the timing correction included in the handover message.

2. A satellite user terminal (UT), comprising:

a receiver configured to receive downlink data transmissions from a radio access network (RAN) node of a satellite communications network via one or more satellites of the satellite communications network;

a transmitter configured to transmit uplink data transmissions to the RAN node via the one or more satellites of the satellite communications network; and a processor; and wherein the receiver is configured to receive an initial handover message from the RAN node, wherein the initial handover message includes a target frequency for receiving the downlink data transmissions from the RAN node via a target satellite of the one or more satellites and a timing correction;

wherein the processor is configured to reconfigure the receiver for receipt of the downlink data transmissions, from the target satellite, via the target frequency, to decode the downlink data transmissions to determine allocations for a physical random access channel (PRACH) of the target satellite provided by the downlink data transmissions, and to initiate a transmission, via the transmitter, of a reply handover message to the RAN node, via the PRACH channel of the target satellite, using the timing correction included in the handover message;

wherein the receiver is further configured to receive a flow assignment message from the RAN, via the downlink data transmissions of the target satellite; and wherein the processor is further configured to reactivate hand-over data flows for transmission and receipt via the target satellite, and to initiate a transmission, via the transmitter, of a channel configuration complete message to the RAN node, via the PRACH channel of the target satellite, using the timing correction included in the handover message.

* * * * *